Patented Aug. 22, 1950

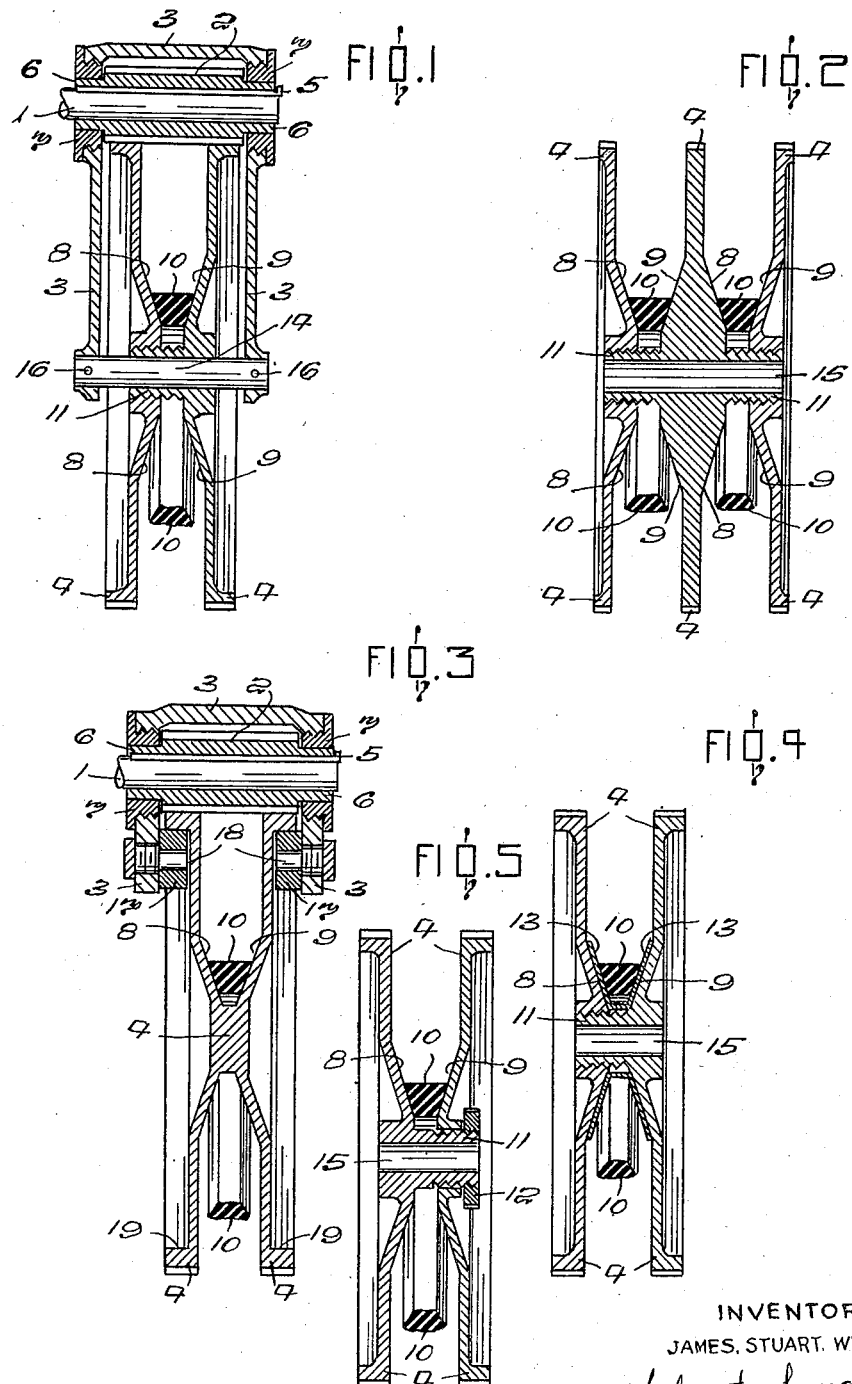

2,519,723

UNITED STATES PATENT OFFICE 2,519,723

TRANSMISSION GEARING FOR USE ON DRIVING SHAFTS

James Stuart Wearn, Christchurch, New Zealand, assignor to Wearn's Patents Limited, Christchurch, New Zealand, a company of New Zealand Application July 9, 1945, Serial No. 603,967
In New Zealand July 12, 1944

2 Claims. (Cl. 74—217)

This invention relates to reduction gearing for use in transmitting power from a high-speed driving shaft, such as that of an electric motor, to operate a driven shaft at a suitably lower speed, and refers to that type of gearing in which a belt drive is employed.

In such cases it is often impracticable to obtain the required speed reduction by means of a single stage belt drive and consequently the introduction of further gearing becomes necessary.

It is an object of the invention to provide, for mounting upon the driving shaft, in place of the usual pulley, a reduction unit of novel and simple construction, capable of being inexpensively manufactured, and including a train of gear wheels and a belt drive which latter is arranged to place the belt-tension fairly with the width of the gear wheels, thereby avoiding any tendency for the unit to be canted laterally and so subject the driving shaft to unnecessary strain.

Another object of the invention is to provide a unit of this description incorporating provision whereby the gear ratio between the driving and driven shafts may be adjusted, thus permitting of the unit being manufactured in standard form and readily adapted to the special requirements of each purpose to which it may be applied.

A further object is to provide, in a unit of this kind, means whereby it may be adjusted to set a desired limit to the amount of power capable of being transmitted, so that, in the event of the effort entailed in operating the driven shaft exceeding such limit, slip will occur, thereby avoiding damage that might otherwise result to the driven machine or to the electric motor or other source of power.

With these and other objects in view, the construction includes briefly, a pinion adapted for fixing on the driving shaft, a frame floatably mounted concentrically with such shaft and in which frame is rotatably mounted a spur-wheel meshing with the said pinion, such spur-wheel being peripherally grooved through its teeth to provide opposed cone surfaces to receive a belt drive of the V-type connecting with the driven shaft.

The invention further provides for the spur-wheel being composed of parts each including a cone surface and a peripheral series of teeth, such parts being connected by axially disposed screw means whereby the spacing apart of the said cone surfaces may be varied for the purpose of adjusting the riding position of the belt drive radially with respect to the axial centre of the wheel.

The invention contemplates also the provision of a liner formed to receive the said belt drive, such liner being interposed between the said cone surfaces to be frictionally engaged thereby for the purpose of limiting the amount of power transmitted to the driven shaft.

In order that the nature of the invention and its construction may be clearly understood, it will now be more fully described and explained with reference to the accompanying drawings, in which:

Fig. 1 shows, in sectional plan-view, a unit in accordance with the invention in which provision is made for enabling the cone surfaces to be adjusted, Fig. 2 shows, in similar form, a spur-wheel having two pairs of adjustable cone surfaces, Fig. 3 shows, also in sectional plan-view, a unit in which the cone surfaces are of a fixed or non-adjustable form and illustrating an alternative method of rotatably mounting the spur-wheel for that of the preceding figures, Fig. 4 shows, in similar form, a spur-wheel incorporating means for limiting the amount of power transmitted to the driven shaft, and, Fig. 5 shows, in similar form, a spur-wheel having adjustable cone surfaces and illustrating an alternative method of effecting such adjustment for that shown in the preceding figures.

As here shown, I represents a portion of a driving shaft, such for instance as that of an electric motor or other source of power.

Adapted for fixing upon the shaft 1, to rotate therewith, is a pinion 2, while floatably mounted concentrically with such shaft 1, to extend radially therefrom, is a frame 3 in which is rotatably mounted a spur-wheel 4.

This mounting of the frame 3 may be accomplished in any appropriate manner, as for example the pinion 2 may be fixed upon or formed integral with a sleeve to be received on the shaft 1 and drivably connected thereto, as by a key 5, such sleeve providing at either end of the pinion journals 6 rotatable in bearings 7 in the frame 3.

If preferred, in lieu of the plain bearings, so provided, some form of anti-friction bearings, such as ball-bearings or roller bearings, may be employed in thus mounting the frame.

The spur-wheel 4 is provided with one or more pulleys each consisting of an opposed pair of cone surfaces 8 and 9 to receive therebetween an endless belt 10 of the V-type adapted to pass around a pulley on the driven shaft, such pulley 8—9 being constituted by a peripheral grooved formation of the spur-wheel through the teeth thereof.

The said pulley or pulleys 8—9 will preferably be disposed symmetrically with respect to the two lateral sides of the spur-wheel 4.

Thus, for example, in the case of a single pulley, as here shown in Figs. 1, 3, 4 and 5, such pulley will b positioned mid-way between the two sides of the wheel, while a pair of pulleys, as in Fig. 2, will be disposed at points equidistantly spaced one from each of such lateral sides of the wheel.

The said pulley or pulleys 8—9 may be of fixed or constant diameter and in which case the wheel 4 may be formed in a single piece, as in Fig. 3.

In a preferred form of the invention, however, such pulley or pulleys will be adjustable for the purpose of causing the belt to ride at a greater or less radius from the axial centre of the wheel in order to enable the gear ratio to be adjusted to operate the driven shaft at a desired speed.

Thus, as shown in Fig. 1, the wheel is divided into two parts each including one of the cone surfaces 8 or 9 and a peripheral series of gear teeth adapted to mesh with those of the pinion 2.

The two parts, thus constituted, are connected by axially arranged screw means, consisting for example of a sleeve 11 having an external screw thread to be received in correspondingly screw threaded bores in the two parts of the wheel, or preferably, as here shown, such sleeve 11 may be formed integral with one of such parts and screwed into a bore in the other part.

The pulley will therefore be of the known expanding type, the adjustment being effected by dismounting the wheel and screwing or rotating one of its said parts relative to the other, thereby causing its cone surfaces 8 and 9 to approach or recede from one another to place the riding position of the belt 10 at the desired radius from the axis of the wheel and, which being accomplished, such parts will be retained in their said relation by re-meshing their teeth with those of the pinion 2.

Similarly, in cases where the spur-wheel is provided with two or more pulleys, as in Fig. 2, such wheel will be divided into three or more parts interconnected by screw means.

In cases where it is desired to avoid dismounting the spur-wheel for the purpose of adjusting the pulley, one portion of such wheel may be formed with a plain or non-threaded bore, as shown in Fig. 5 to slidably receive the sleeve 11 and in which case the adjustment will be effected by means of a nut, as 12, screwed upon such sleeve to bear inward against such sliding part in opposition to the outward pressure imposed on such part by the belt 10. In such case suitable locking means may be provided to retain the nut 12 in place when the adjustment has been made.

Referring now to the modification shown in Fig. 4 designed to provide a pulley of fixed or constant diameter with provision for limiting the amount of power transmitted to the driven shaft.

The construction is similar to that of Fig. 1 with the addition of a liner 13 presenting a pair of opposed cone faces between which the belt 10 rides, such liner being interposed between the cone faces 8 and 9 to be frictionally engaged thereby.

The said liner is capable of axial rotation about the sleeve 11 and its outer lateral faces are formed to correspond with the cone faces 8 and 9.

The arrangement is such therefore that, by dismounting the spur-wheel and screwing the composing parts, in the manner already explained, to cause the cone faces 8 and 9 to bear with the required pressure against the lateral sides of the liner, the frictional grip of the latter by such cone faces 8 and 9 may be adjusted as desired.

If preferred, the adjustment of the parts of the spur-wheel to cause the cone faces 8 and 9 to exercise the desired frictional grip upon the liner 13, may be effected by means of a nut screwed upon the sleeve 11 in a manner similar to that shown in Fig. 5.

The mounting of the spur-wheel 4 in the frame 3 may consist of a pin or axle 14 rotatably received in an axial bore 15 in such wheel, the two ends of such axle being received in holes formed one in each of the two side members or cheeks of the frame and retained by suitable means, such for instance as pins 16 transfixing such axle.

The said mounting will preferably permit of the wheel 4 sliding lengthwise upon the axle 14 within limits provided by the said cheeks of the frame, thus enabling the pulley 8—9 to automatically adjust its alignment with that of the driven shaft.

In cases where the spur-wheel is formed in one piece, as in Fig. 3, there may, if desired, be substituted for the above described method of rotatably mounting such spur-wheel, a pair of rollers 17 rotatably carried by journals 18 fixed at corresponding points in the cheeks of the frame to project inward from the latter with their peripheries rolling in contact with the inner peripheries of flanges 19 of such wheel.

In operation, the unit is mounted by affixing the pinion 2 on the driving shaft, the pulley or pulleys being if necessary adjusted in the manner described and connected with the driven shaft by the belt or belts 10 the tension of which serves to hold the frame 3 in position.

It will be appreciated therefore that the frame, by swinging to or from the driven shaft, will automatically accommodate its position to compensate for changes in the spacing between the driving and driven shafts resulting from adjustment of the riding position upon the driving pulley of a belt of fixed or constant length.

I claim:

1. Transmission gearing for use on a driving shaft, including a pinion adapted for fixing on said shaft, a frame floatably mounted about said shaft, and an externally toothed spur-wheel meshing with said pinion and rotatably mounted in said frame, said spur-wheel being grooved peripherally to divide its teeth into sections and provide opposed cone surfaces to receive a belt drive of the V-type to connect with a driven shaft, characterized in that said spur-wheel is divided between said cone surfaces into parts interconnected by axially disposed screw means whereby the spacing between said cone surfaces may be varied to adjust the riding position of said belt drive radially with respect to the axle of said spur-wheel, said divided parts of the spur-wheel being locked in their adjusted positions by meshing the teeth of each spur-wheel part with the teeth of said pinion.

2. Transmission gearing for use on a driving shaft, including a pinion adapted for fixing on said shaft, a frame floatably mounted about said shaft, an externally toothed spur-wheel rotatably mounted in said frame and meshing with said pinion, and opposed cone surfaces to receive a belt drive to connect with a driven shaft provided by peripheral grooving of said spur-wheel through its teeth, characterized in that said spur-wheel is divided by said grooving into parts and further characterized in that adjacent of said parts are provided one with a screw threaded axial sleeve and the other with a correspondingly threaded bore, said adjacent parts of the spur-wheel being secured in their operable position against axial movement relative to one another by meshing the external teeth of each spur-wheel part with the teeth of said pinion.

JAMES STUART WEARN.

REFERENCES CITED

The following references are of record in the file of this patent:

UNITED STATES PATENTS

| Number | Name | Date |
|---|---|---|
| 278,821 | Reid | June 5, 1883 |
| 438,250 | Diescher | Oct. 14, 1890 |
| 1,952,884 | Nichols et al. | Mar. 27, 1934 |
| 2,135,467 | Metz | Nov. 1, 1938 |
| 2,144,028 | Pilkington | Jan. 17, 1939 |
| 2,396,860 | Lee | Mar. 19, 1946 |